(12) United States Patent
Chung

(10) Patent No.: US 10,377,199 B2
(45) Date of Patent: Aug. 13, 2019

(54) APPARATUS FOR COUPLING TRAILING ARM

(71) Applicant: Hyundai Motor Company, Seoul (KR)

(72) Inventor: Byung Joo Chung, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 222 days.

(21) Appl. No.: 15/257,759

(22) Filed: Sep. 6, 2016

(65) Prior Publication Data

US 2017/0274716 A1    Sep. 28, 2017

(30) Foreign Application Priority Data

Mar. 28, 2016    (KR) .................. 10-2016-0037009

(51) Int. Cl.
*B60G 3/20* (2006.01)
*B60G 7/00* (2006.01)

(52) U.S. Cl.
CPC .............. *B60G 3/20* (2013.01); *B60G 3/202* (2013.01); *B60G 7/001* (2013.01); *B60G 2200/182* (2013.01); *B60G 2204/14* (2013.01); *B60G 2204/148* (2013.01); *B60G 2204/41* (2013.01); *B60G 2206/10* (2013.01)

(58) Field of Classification Search
CPC .......... B60G 3/20; B60G 7/001; B60G 3/202; B60G 2204/41; B60G 2206/10; B60G 2204/14; B60G 2200/182; B60G 7/008; B60G 7/02; B60G 2204/148; B60G 2200/141

See application file for complete search history.

(56) References Cited

U.S. PATENT DOCUMENTS

| | | | | |
|---|---|---|---|---|
| 2,344,896 A * | 3/1944 | Phelps | ..................... | B60G 7/02 267/222 |
| 2,707,100 A * | 4/1955 | Schilberg | ............... | B60G 11/16 267/254 |
| 4,334,693 A * | 6/1982 | Huber | ..................... | B60G 3/28 280/124.143 |
| 4,400,009 A * | 8/1983 | Raidel | ..................... | B60G 7/00 280/124.177 |
| 4,544,180 A * | 10/1985 | Maru | ..................... | B60G 9/003 280/124.106 |
| 4,690,426 A * | 9/1987 | Kubo | ..................... | B60G 3/202 280/124.131 |
| 4,754,992 A * | 7/1988 | Asanuma | ................. | B60G 3/22 280/124.135 |

(Continued)

FOREIGN PATENT DOCUMENTS

| | | |
|---|---|---|
| JP | 2007-83773 A | 4/2007 |
| JP | 2007-307968 A | 11/2007 |

(Continued)

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

An apparatus for coupling a trailing arm may include a carrier having defining an open space on one side thereof, a trailing arm, one end of which includes an extension inclined at a predetermined angle and inserted into the space, and an assist arm, an end of which is inserted into the space and positioned on one side of the extension, in which the extension and the end of the assist arm inserted into the space may be integrally coupled to the carrier.

10 Claims, 3 Drawing Sheets

(56) References Cited

U.S. PATENT DOCUMENTS

| | | | | |
|---|---|---|---|---|
| 4,790,560 A * | 12/1988 | Asanuma | ............... | B60G 3/22 280/124.128 |
| 4,986,567 A * | 1/1991 | Kubo | ............... | B60G 3/22 280/124.131 |
| 5,340,146 A * | 8/1994 | Kato | ............... | B60G 3/202 280/124.135 |
| 5,409,254 A * | 4/1995 | Minor | ............... | B60G 9/003 267/190 |
| 5,439,243 A * | 8/1995 | Kato | ............... | B60G 9/00 280/124.106 |
| 5,931,485 A * | 8/1999 | Modinger | ............... | B60G 7/008 280/86.75 |
| 6,179,328 B1 * | 1/2001 | Kawagoe | ............... | B60G 9/003 280/124.106 |
| 6,843,492 B2 * | 1/2005 | Inoue | ............... | B60G 3/20 280/124.135 |
| 6,945,547 B2 * | 9/2005 | Ackley | ............... | B60G 3/18 280/124.143 |
| 7,111,855 B2 * | 9/2006 | Winkler | ............... | B60G 3/20 280/86.754 |
| 7,325,820 B2 * | 2/2008 | Allen | ............... | B60G 3/18 280/124.109 |
| 7,431,315 B2 * | 10/2008 | Jargowsky | ............... | B60G 3/202 280/124.128 |
| 7,748,727 B2 * | 7/2010 | Murayama | ............... | B60G 3/20 280/124.135 |
| 7,896,372 B2 * | 3/2011 | Yanagida | ............... | B60G 3/20 280/124.135 |
| 8,973,931 B2 * | 3/2015 | Branger | ............... | B60G 7/02 267/276 |
| 9,030,033 B2 * | 5/2015 | Yoo | ............... | B60G 7/02 180/165 |
| 9,162,546 B2 * | 10/2015 | Girelli Consolaro | ............... | B60G 21/0551 |
| 9,205,716 B2 * | 12/2015 | Yoo | ............... | B60G 7/006 |
| 9,463,677 B2 * | 10/2016 | Czerr | ............... | B60G 3/202 |
| 9,855,806 B1 * | 1/2018 | Jo | ............... | B60G 3/00 |
| 2011/0272912 A1 * | 11/2011 | Le Gourvellec | ............... | B60G 7/001 280/124.135 |

FOREIGN PATENT DOCUMENTS

| | | |
|---|---|---|
| JP | 2008-195296 A | 8/2008 |
| KR | 10-2013-0067446 A | 6/2013 |

\* cited by examiner

APPARATUS FOR COUPLING TRAILING ARM

CROSS REFERENCE TO RELATED APPLICATION

The present application claims priority to Korean Patent Application No. 10-2016-0037009, filed Mar. 28, 2016, the entire contents of which is incorporated herein for all purposes by this reference.

BACKGROUND OF THE INVENTION

Field of the Invention

The present invention relates to a mounting structure for a trailing arm, a carrier, and an assist arm of a vehicle and, more particularly, to an apparatus for coupling a trailing arm, which can prevent release of a fastening member and improve stiffness without a mounting part for mounting an assist arm onto the trailing arm and a carrier.

Description of Related Art

Generally, a rear wheel of a vehicle is provided with a carrier rotatably supporting the wheel, a trailing arm extending along a longitudinal direction of a vehicle and connected to a vehicle body and the carrier at both ends thereof, and a lower arm extending along a horizontal direction of a vehicle such that one end thereof is connected to a vehicle body and the other end thereof is coupled to the carrier by a bolt and a nut. The trailing arm and the lower arm facilitate a bump and a rebound of a vehicle and belong to a rear suspension of a vehicle. In the rear suspension, a variation in wheel camber is allowed with organic connection among an upper arm, the lower arm, an assist arm, and the trailing arm.

In such a conventional suspension of a vehicle, when a brake force is applied to a wheel, a longitudinal force acts on the carrier. The force applied to the carrier is loaded onto a connection part between one end of the trailing arm and the carrier. Thus, there is a need for a sufficient bolt-nut fastening force to resist the force applied to the connection part. In this case, it can be accomplished by increasing the size and number of the bolts and nuts, but an increase in weight and cost will occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for coupling a trailing arm, capable of implementing a firm suspension securing stiffness and preventing release of a bolt without interference from other peripheral parts.

According to various aspects of the present invention, an apparatus for coupling a trailing arm including a carrier having defining an open space on one side thereof, a trailing arm, one end of which includes an extension inclined at a predetermined angle and inserted into the space, and an assist arm, an end of which is inserted into the space and positioned on one side of the extension, in which the extension and the end of the assist arm inserted into the space are integrally coupled to the carrier.

A first boundary of the space may be coupled with the trailing arm at multiple positions, and a second boundary of the space may include a through-hole through which the assist arm is coupled.

The extension may be in contact with and supported by an inner portion of a first boundary of the space.

A bushing of the assist arm may pass through and may be coupled into the space.

The extension may be an inclined bend at a lower side of the one end of the trailing arm.

The extension may be an inclined bend at a lower side of the one end of the trailing arm, and an indentation groove may be formed between the extension and a remainder of the trailing arm that does not form the bend.

The trailing arm and the carrier may be coupled to have a horizontal orientation relative to a vehicle on which the apparatus is implemented.

The extension and the carrier may be coupled to have a longitudinal orientation relative to a vehicle on which the apparatus is implemented.

The extension may be bent towards a wheel of a vehicle on which the apparatus is implemented.

The extension may be bent towards a wheel of a vehicle.

According to the trailing arm-coupling apparatus having the above-mentioned construction, a fastening part of the assist arm extending from a carrier-mounting part of the trailing arm in the related art can be removed.

Further, both ends of the assist aim are respectively coupled to the extension of the trailing arm and the carrier, providing a reinforced structure. In particular, the configuration in which the trailing arm and the carrier are coupled at two points in a horizontal direction of a vehicle, and the extension of the trailing arm and the carrier are coupled in a longitudinal direction of a vehicle provides two-direction coupling while maintaining a 3-point support structure, thus providing an effect of preventing the release of a fastening member having a 2-point support structure and improving stiffness as well.

Furthermore, a fastening member as well as mounting parts of the assist arm respectively formed on the trailing arm and the carrier can be removed, reducing weight and cost.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) intended to cover not only the exemplary embodiments, but also various alternatives, modifications, equivalents and other embodiments, which may be included within the spirit and scope of the invention as defined by the appended claims.

Figure 1:
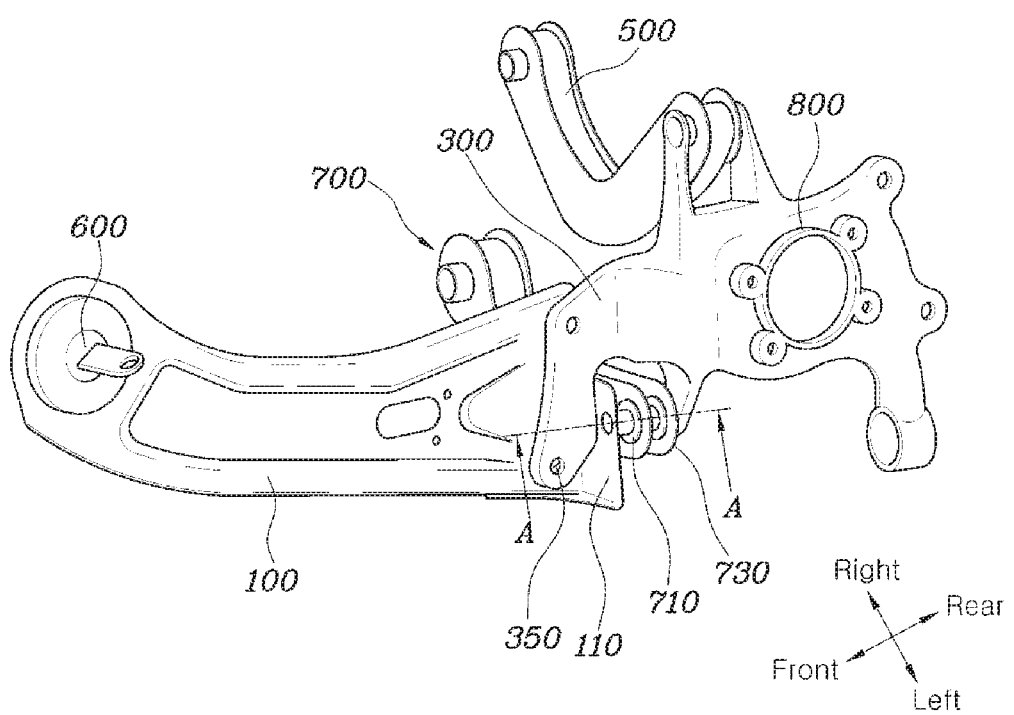
FIG. 1 is a view illustrating an apparatus for coupling a trailing arm according to various embodiments of the present invention.
Figure 2:
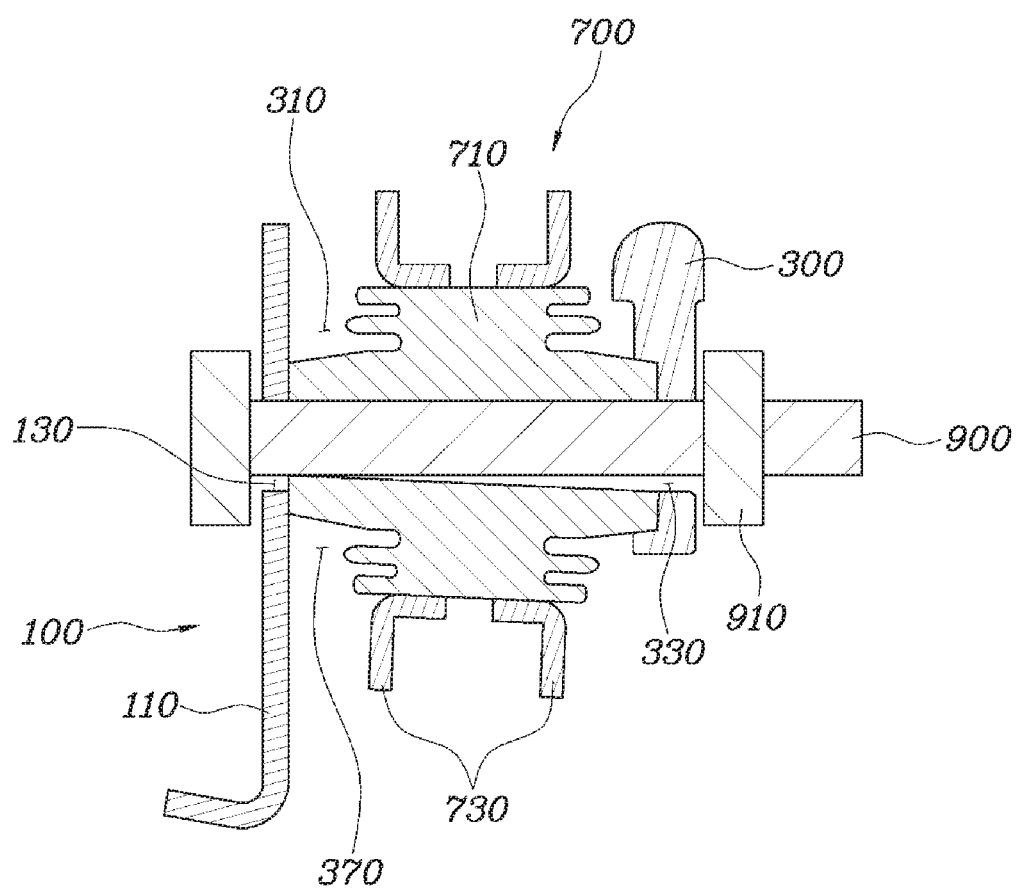
FIG. 2 is a cross-sectional view taken along a line A-A of FIG. 1.
Figure 3:
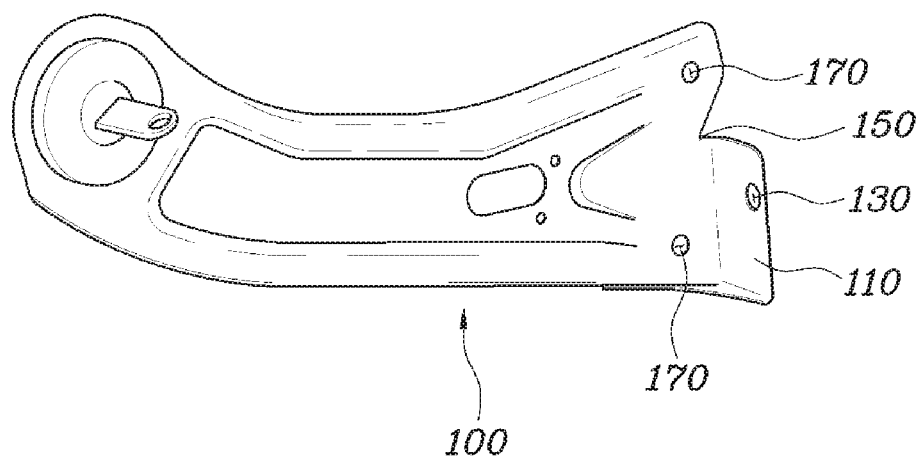
FIG. 3 is a view illustrating a trailing arm according to various embodiments of the present invention.

FIG. 1 is a view illustrating an apparatus for coupling a trailing arm according to various embodiments of the present invention, FIG. 2 is a cross-sectional view taken along a line A-A of FIG. 1, and FIG. 3 is a view illustrating a trailing arm 100.

The apparatus for coupling a trailing arm includes a carrier 300 having an open space 310 on one side thereof, a trailing arm 100 having, on one end thereof, an extension 110 inclined at a certain angle, the extension 110 being inserted into the space 310, and an assist arm 700 having an end inserted into the space 310 and positioned on one side of the extension 110, wherein the extension 110 and the end of the assist arm 700 inserted into the space 310 are integrally coupled to the carrier 300.

The trailing arm 100 is provided, on one side, with the extension 110 bent at a certain angle, and a rubber bushing joint 600 is coupled to the other side of the trailing arm. The extension may be bent towards a wheel of a vehicle. The trailing arm 100 is provided, on one side, with through-holes 170 for coupling with the carrier 300, and the extension 110 is provided with a through-hole 130 for coupling with the assist arm 700. The coupling of the trailing arm with the carrier and the assist arm is performed by fastening members. The fastening members may be a bolt 900 and a nut 910 that are commonly used, but they may adopt other fastening means according to design or conditions.

The carrier 300 is provided, on opposite sides thereof, with the open space 310 and a hub knuckle 800 to which a wheel of a vehicle is coupled. An upper arm 500 is coupled to an upper side of the hub knuckle 800. Although an open surface 370 of the space 310 is illustrated to be formed at a lower side of the space, the open surface 370 may be provided at an upper side or a lateral side of the space according to design or conditions.

One boundary defining the space 310 is formed like a plate, and is coupled with one side of the trailing arm 100, which is also formed like a plate, at multiple sites. Here, one side of the trailing arm 100 is provided with a through-hole 170 and one boundary of the space 310 is provided with a corresponding through-hole 350, so that the trailing arm 100 and the carrier 300 can be coupled through the through-holes by fastening members. The other boundary of the space 310 is bent in the same direction as the extension 110, and is formed to have a certain thickness, particularly, so that a through-hole 330 passing through the other side of the space 310 is formed.

The carrier 300 is coupled to the trailing arm 100 in such a manner as to cover the extension 110 through the open surface 370 of the space 310. Further, the extension 110 is in close contact with an inner portion of one boundary of the space 310, so that even though the carrier 300 is supported by the extension 110, a sufficient space to allow a bushing 710 of the assist arm 700 to be coupled is secured between one boundary and the other boundary of the space.

The assist arm 700, particularly the bushing 710 coupled to an assist arm link 730, passes through and is coupled into the space 310 such that one side thereof is coupled to the extension 110 and the other side thereof is coupled to the carrier 300. Here, the bushing 710 of the assist arm passes through the through-hole 130 of the extension 110 and the through-hole 330 of the carrier 300 and is coupled by the fastening members 900 and 910.

To be specific, the extension 110 of the trailing arm 100 is preferably bent at a certain level from a lower side of an entire height of one end of the trailing arm 100.

The reason why the extension 110 is formed at the lower side is for providing a 3-point support structure to reduce a load applied to a fastening member (bolt) and to prevent the release of the fastening member when coupling the trailing arm 100, the carrier 300, and the assist arm 700.

In the meantime, there is a case in which a filler neck of a fuel tank is disposed on an upper portion of the trailing arm. In this case, interference occurs between the filler neck and a mounting part between the trailing arm and the carrier. Thus, the mounting part should be provided towards the lower side. In this case however, the mounting part overlaps with a mounting part of the assist arm, making it difficult to produce a 3-point support structure.

Thus, the extension 110 is formed at a certain level from the lower side of the trailing arm. 100, so that a 3-point support structure can be formed without interference with the filler neck of the fuel tank. Further, an indentation groove 150 is formed between the extension 110 and the remainder of the trailing arm 100 that is not bent, thereby preventing interference occurring from a vertical motion of the assist arm 700 and preventing load concentration onto an end of the extension, thereby improving durability of parts and securing a firm structure.

The trailing arm 100 and the carrier 300 are coupled in a 2-point support structure occurring at upper and lower sides such that they have a horizontal orientation relative to a vehicle. Further, the extension 110 and the carrier 300 are coupled to have a longitudinal orientation relative to a vehicle. Consequently, a total 3-point support structure can be obtained. Thus, according to this configuration, although during a bump or a rebound of a vehicle, torque is generated in a rotary direction of a fastening member of a 2-point support structure for the trailing arm 100 and the carrier 300 so as to cause the release of the fastening member, due to the longitudinal coupling of the extension 110 and the carrier 300, the release of the fastening member for the trailing arm 100 and the carrier 300 is prevented and stiffness of the coupling structure is also improved.

Such configurations are adapted to the trailing arm 100 and the carrier 300 of a rear-wheel suspension of a vehicle.

That is, as described before, according to the trailing arm-coupling apparatus having the above-mentioned construction, a fastening part of the assist arm extending from a carrier-mounting part of the trailing arm in the related art can be removed. Further, both ends of the assist arm are coupled to the extension of the trailing arm and the carrier, providing a reinforced structure. In particular, the configuration in which the trailing arm and the carrier are coupled at two points in a horizontal direction of a vehicle, and the extension of the trailing arm and the carrier are coupled in a longitudinal direction of a vehicle provides two-direction coupling while maintaining a 3-point support structure, thus providing an effect of preventing the release of a fastening member having a 2-point support structure and improving stiffness as well.

Furthermore, a fastening member as well as mounting parts of the assist arm respectively formed on the trailing arm and the carrier can be removed, reducing weight and cost.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for coupling a trailing arm for a vehicle, comprising:
   a carrier having an open space on one side thereof;
   the trailing arm, a first end of which includes an extension inclined at a predetermined angle and inserted into the open space; and
   an assist arm, an end of which is inserted into the open space and positioned on one side of the extension, wherein the extension and the end of the assist arm coupled to each other by a single member and inserted into the open space are coupled to the carrier by the single member in common.

2. The apparatus according to claim 1, wherein a first boundary of the open space is coupled with the trailing arm at a plurality of positions, and a second boundary of the open space includes a through-hole through which the assist arm is coupled by the single member.

3. The apparatus according to claim 2, wherein the extension is in contact with and supported by an inner portion of the first boundary of the open space.

4. The apparatus according to claim 1, wherein a bushing of the assist arm is configured to pass through and is coupled into the open space.

5. The apparatus according to claim 1, wherein the extension is an inclined bend at a lower side of the first end of the trailing arm.

6. The apparatus according to claim 1, wherein the extension is an inclined bend at a lower side of the first end of the trailing arm, and an indentation groove is formed between the extension and a remainder of the trailing arm that does not form the inclined bend.

7. The apparatus according to claim 1, wherein the trailing arm and the carrier are coupled by the single member to have a horizontal orientation relative to the vehicle on which the apparatus is implemented.

8. The apparatus according to claim 1, wherein the extension and the end of the assist arm inserted into the open space are coupled to the carrier by the single member in a longitudinal direction relative to the vehicle.

9. The apparatus according to claim 1, wherein the extension is bent towards a wheel of the vehicle on which the apparatus is implemented.

10. An apparatus for coupling a trailing arm for a vehicle, comprising:
    a carrier having an open space on one side thereof;
    the trailing arm, a first end of which includes an extension inclined at a predetermined angle and inserted into the open space; and
    an assist arm, an end of which is inserted into the open space and positioned on one side of the extension,
    wherein the trailing arm and the carrier are coupled in a first direction, and the extension and the end of the assist arm inserted into the open space are coupled to the carrier in a second direction different from the first direction.

* * * * *